United States Patent
Yang et al.

(10) Patent No.: US 8,312,506 B2
(45) Date of Patent: Nov. 13, 2012

(54) DIGITAL TELEVISION SETTING INFORMATION STORAGE APPARATUS AND METHOD FOR ACCESSING DIGITAL TELEVISION INFORMATION

(75) Inventors: Chih Wei Yang, Hsinchu Hsien (TW); Chi Hung Yang, Hsinchu Hsien (TW); Hung Kai Ting, Hsinchu Hsien (TW); Chi Ming Su, Hsinchu Hsien (TW)

(73) Assignee: Mstar Semiconductor, Inc, Hsinchu Hsien (TW)

( * ) Notice: Subject to any disclaimer, the term of this patent is extended or adjusted under 35 U.S.C. 154(b) by 1048 days.

(21) Appl. No.: 12/254,087

(22) Filed: Oct. 20, 2008

(65) Prior Publication Data

US 2009/0113477 A1 Apr. 30, 2009

(30) Foreign Application Priority Data

Oct. 26, 2007 (TW) ................................ 96140367 A (51) Int. Cl.
*H04N 7/16* (2006.01)

(52) U.S. Cl. ......... 725/152; 711/162; 725/132; 717/168

(58) Field of Classification Search .............. 725/45–47, 725/131, 132, 151, 152; 711/100–105, 118–124, 711/162; 717/170; 719/328; 348/553
See application file for complete search history.

(56) References Cited

U.S. PATENT DOCUMENTS

| 6,343,379 B1 * | 1/2002 | Ozawa et al. | 725/63 |
| 6,530,083 B1 * | 3/2003 | Liebenow | 725/46 |
| 2007/0180460 A1 * | 8/2007 | Park | 725/25 |
| 2008/0028434 A1 * | 1/2008 | Drazin | 725/134 |
| 2008/0177923 A1 * | 7/2008 | Klein | 710/306 |

* cited by examiner

*Primary Examiner* — Scott Beliveau
*Assistant Examiner* — Patrick A Ryan
(74) *Attorney, Agent, or Firm* — WPAT PC; Justin King (57) ABSTRACT

A digital television setting information storage apparatus and a method for accessing digital television information are provided. The apparatus includes a random access memory and a non-volatile memory. The method includes steps of: receiving a setting information change signal, storing setting information into the random access memory, clearing the non-volatile memory, and transferring the setting information from the random access memory to the non-volatile memory when the non-volatile memory is erased. The setting information includes channel information and on screen display setting information.

14 Claims, 7 Drawing Sheets

DIGITAL TELEVISION SETTING INFORMATION STORAGE APPARATUS AND METHOD FOR ACCESSING DIGITAL TELEVISION INFORMATION

FIELD OF THE INVENTION

The present invention relates to a digital television setting information storage apparatus and a method for accessing digital television information, and more particularly to a storage apparatus and a method for accessing information associated with setting information of digital television by way of a flash memory.

BACKGROUND OF THE INVENTION

Today in the digital era, as digital television and digital signal processing technology progresses, digital television programs and high definition televisions have become a mainstream. Considering traditional television signals transmitted by cable or wireless means, the signals are transmitted as analog signals. Therefore, noises are accumulated along the transmission path to undesirably affect play quality. In contrast, the noise issue may be avoided when using digital signal transmission. Not only the signal clarity is maintained, but also a higher volume of data can be carried on a same channel by compressing and encoding the data. Further, digital signal transmission also allows implementation of more signal processing methods.

Figure 1:
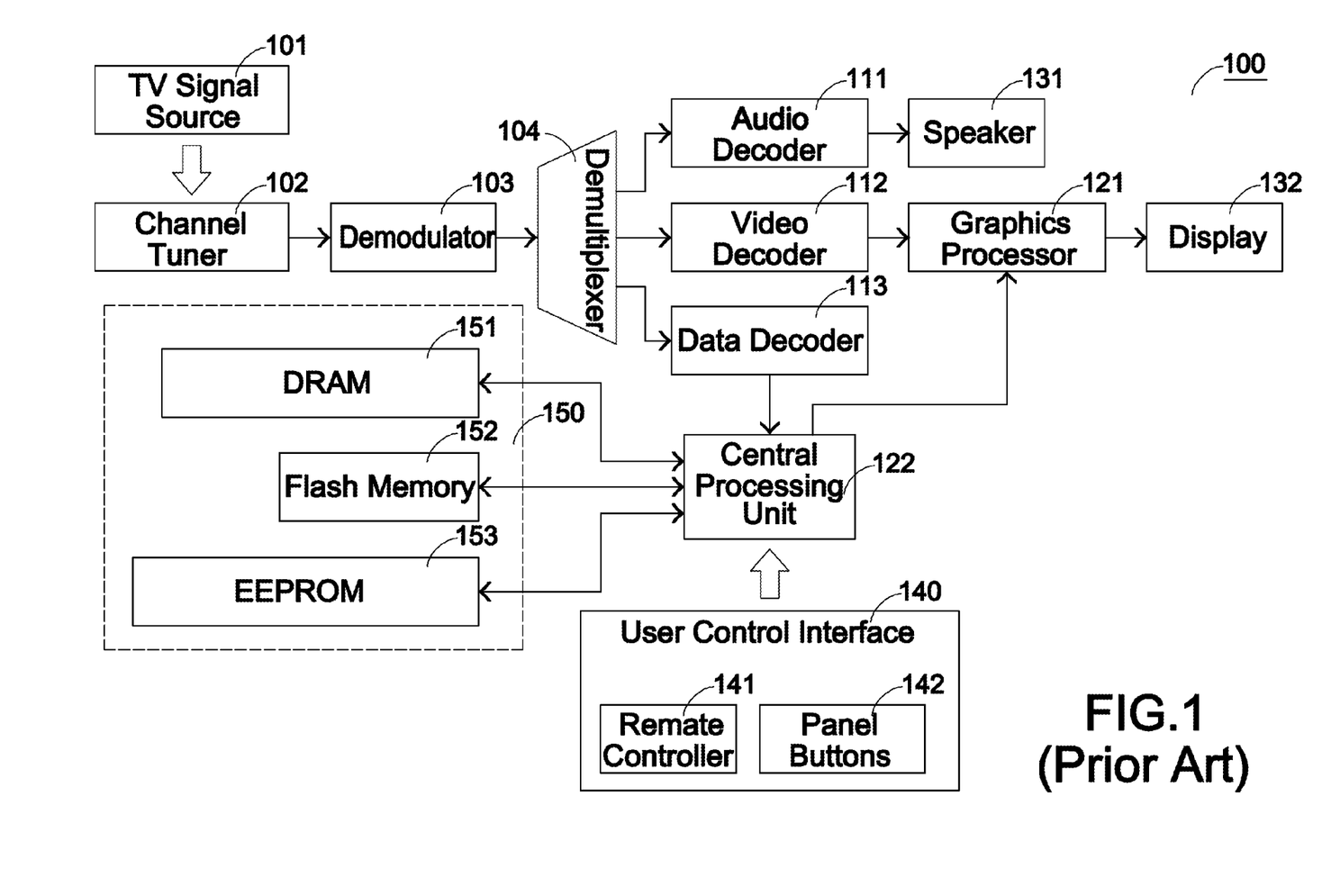
FIG. 1 is a schematic diagram showing a function block of a conventional digital television 100.

FIG. 1 is a schematic functional block diagram of a conventional digital television 100. Referring to FIG. 1, via a channel tuner 102, a digital television 100 receives television signals generated by a television signal source 101. After being processed by a demodulator 103 and a demultiplexer 104, the television signals are decoded by an audio decoder 111, a video decoder 112 and a data decoder 113. Audio data is played on a speaker 131, and video data is displayed on a display panel 132 after being processed by a graphics processor 121.

The television signals input from the television signal source 101 are first decoded by the data decoder 113 and then sent to a central processing unit 122 for further processing. By operating a control interface 140 including a remote controller 141 and panel buttons 142 on the digital television, user-specified setting information of various functions is processed by the central processing unit 122, and then stored and recorded in a system memory 150. The system memory 150 comprises a dynamic random access memory (DRAM) 151, a flash memory 152, and an electrically erasable programmable read-only memory (EEPROM) 153.

Information associated with the foregoing television signals including number of channels, channel frequencies, channel identification codes, channel program titles, channel program ratings and channel sequence, as well as an electronic programming guide (EPG) and interactive information, is generally referred as channel information. For example, the digital television 100 is set to perform autoscan on the received television signals, and the display panel 132 displays corresponding information of the autoscan result such as the number and sequence of channels. That is, the number of channels of cabled and wireless programs, and corresponding video and audio channels, is obtained. Based on the channel identification code, the central processing unit 122 combines corresponding video and audio channels using the channel identification code so as to display a complete television program. For example, a video channel, or a visual channel, may correspond to several audio channels, or sound channels such as in different language versions of English, French, and Spanish. Updates and records of the information are stored in the system memory 150 for the user's future reference.

The foregoing setting information associated with functions of the user control interface 140 include contrast, brightness and chromaticity of images on the digital television 100, or volume adjustment, display language, special channel lock, information display such as whether to enable display of channel number and time, menu language, sleep timer, no-signal mute, and full blue screen. All the above setting information is called on-screen display (OSD) setting information. For example, while viewing the program, a user is allowed to set audio and video conditions for the speaker 131 and the display panel 132, respectively, and to save the setting information in the system memory 150. Thus, settings of the stored setting information are applicable to other channels switched from an original channel, as well as to channels after again turning on the digital television 100 that is previously turned off with previous audio and display conditions.

According to current technologies, the DRAM 151 of the system memory 150 serves as a register for temporary information storage, and the flash memory 152 is used for recording operating program codes or firmware. Above-mentioned information including settings of channel information and OSD setting information is recorded in the EEPROM 153. Therefore, memory units provided in a conventional digital television set are utilized with designated functions.

The EEPROM 153 indeed provides the function of recording and updating of the setting information of a digital television, and data access of the EEPROM 153 is completed by direct data writing without needing an extra step of clearing the memory, thus speeding up the information recording and update. However, the EEPROM 153 generally has a higher cost. In addition, using several memory units in a digital television set complicates the circuit design. There is a need for an alternative solution of a memory unit for recording and updating the setting information such that the product cost as well as complications of circuit design is reduced.

Accordingly, the primary object of the present invention is to provide an apparatus with lower product cost while attaining the same functions.

SUMMARY OF THE INVENTION

Therefore, the present invention discloses a digital television setting information storage apparatus and a method for accessing digital television information, both of which utilize a flash memory to store setting information associated with the digital television.

The method for accessing digital television information according to the present invention is applied between a digital television unit, a television signal source and a user control interface. The digital television unit comprises a random access memory and a non-volatile memory. The method comprises steps of receiving a setting information change signal from the television signal source or the user control interface, storing setting information into the random access memory, clearing the non-volatile memory, and transferring the setting information from the random access memory to the non-volatile memory when the non-volatile memory is erased. Wherein, the setting information includes channel information and on-screen display (OSD) setting information.

The present invention further provides a digital television apparatus comprising a digital television unit. The digital television unit comprises a central processing unit; a random access memory, controlled by the central processing unit so as to store a set of setting information; and a non-volatile memory having a first section and a second section, and controlled by the central processing unit, so as to transfer first information of the setting information from the random access memory to the first section and the setting information from the random access memory to the second section.

The present invention further provides a digital television comprising a central processing unit; a random access memory, controlled by the central processing unit so to store setting information; and a non-volatile memory, controlled by the central processing unit so as to transfer the setting information from the random access memory to the non-volatile memory. Wherein, the central processing unit executes other tasks after sending a clear request to the non-volatile memory, and transfers the setting information from the random access memory to the non-volatile memory when clearing of the non-volatile memory is completed. The setting information includes channel information and OSD setting information.

The present invention further provides a method for accessing digital television information. The method is applied between a digital television unit, a television signal source and a user control interface. The digital television unit comprises a central processing unit, a random access memory and a non-volatile memory. The method comprises steps of receiving a first setting information change signal from the television signal source or the user control interface; storing setting information into the random access memory by the central processing unit; and clearing the non-volatile memory, storing first information of the setting information from the random access memory to a first section of the non-volatile memory by the central processing unit, and storing the setting information from the random access memory to a second section of the non-volatile memory by the central processing unit.

The present invention provides a digital television setting information storage apparatus comprising a central processing unit; a random access memory, controlled by the central processing unit so as to store setting information; and a non-volatile memory comprising a first section and a second section, and controlled by the central processing unit, so as to transfer first information of the setting information from the random access memory to the first section, and second information of the setting information from the random access memory to the second section. The first section of the non-volatile memory comprises a plurality of storage blocks. The first information of the setting information is stored into free blocks of the storage blocks when the central processing unit transfers the first information of the setting information from the random access memory to the first section. The second section of the non-volatile memory comprises a plurality of storage blocks. The setting information is stored in any one of the plurality of storage blocks of the second section when the central processing unit transfers the setting information from the random access memory to the second section.

The present invention further provides a method for accessing digital television information for a digital television. The digital television comprises a random access memory and a non-volatile memory. The method comprises steps of receiving a setting information change signal; checking whether free storage blocks are available from a plurality of storage blocks of a first section of the non-volatile memory when the setting information change signal indicates only OSD setting information is changed, storing the OSD setting information to one of the storage blocks when free storage blocks are available, or clearing a first section of the non-volatile memory when free storage blocks are unavailable and storing the OSD setting information to one erased block of the plurality of storage blocks; and clearing a second section of the non-volatile memory and storing the setting information to the second section when the setting information change signal indicates changes are made in addition to changes on the OSD setting information. The plurality of storage blocks of the first section of the non-volatile memory are for storing the OSD setting information. The second section of the non-volatile memory comprises at least one storage block for storing the setting information.

The present invention further provides a method for accessing digital television information for a digital television comprising a random access memory and a non-volatile memory. The method comprises steps of storing first setting information received at a first time point into the random access memory; dividing a erased first section of the non-volatile memory into a plurality of storage blocks, and transferring first information of the first setting information from the random access memory to a first storage block of the plurality of storage blocks; storing second setting information received at a second time point into the random access memory; and transferring first information of the second setting information from the random access memory to a second storage block of the plurality of storage blocks.

The present invention further provides a method for accessing digital television information. The method is applied between a digital television unit, a television signal source and a user control interface. The digital television unit comprises a random access memory and a micro drive. The method comprises steps of receiving setting an information change signal from the television signal source or the user control interface; storing setting information into the random access memory; and transferring the setting information from random access memory to the micro drive. The setting information includes channel information and OSD setting information.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

The present invention provides a method for accessing digital television information, and can be applied to a conventional digital television 100 or an associated digital television apparatus as shown in FIG. 1. In other words, the method according to the present invention is based on current digital television technologies and hardware configurations. For example, the method is applicable between a digital television unit, a television signal source 101 and a user control interface 140. As shown in FIG. 1, the digital television unit comprises a central processing unit 122, a dynamic random access memory (DRAM) 151 and a flash memory 152. The flash memory is a non-volatile memory. Alternatively, the non-volatile memory used in the present invention may be a rewritable compact disc in addition to a flash memory. The flash memory is used in a preferred embodiment according to the present invention and shall be described in the following. The DRAM 151 is used as an example of the random access memory for registering information according to a preferred embodiment of the present invention.

Figure 2A:
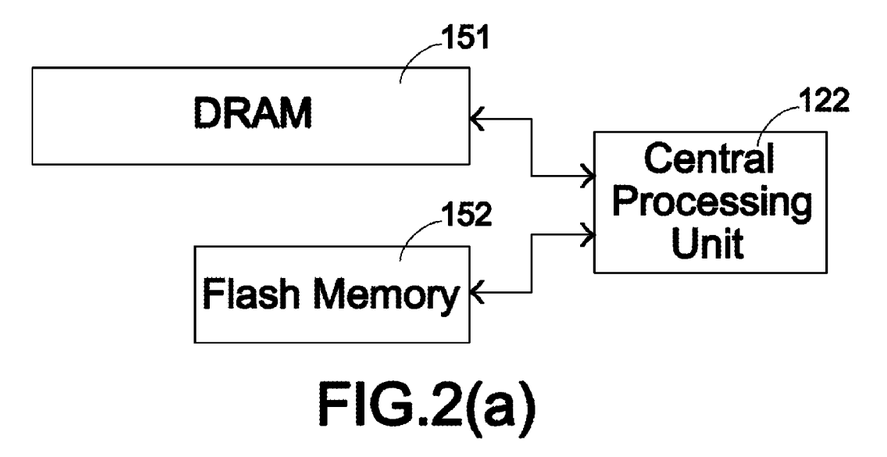
FIG. 2(a) is a diagram showing a hardware configuration used in the method according to the present invention.

A characteristic of a non-volatile memory is that no power is required for maintaining the data in the memory. When a whole device is shut down or powered off, data in the non-volatile memory is kept intact when the device is again powered on. Although being a non-volatile memory, an electrically erasable programmable read-only memory (EEPROM) has higher product cost as mentioned in the prior art, and hence is not adopted for associated information access in the method according to the present inventions. FIG. 2(a) is a diagram showing a hardware configuration used in the method of the present invention. The hardware configuration comprises the central processing unit 122, the DRAM 151 and the flash memory 152. Remaining components or units are identical to those according to the prior art described with reference to FIG. 1. However, an EEPROM is not used in the method according to the present invention.

Figure 2B:
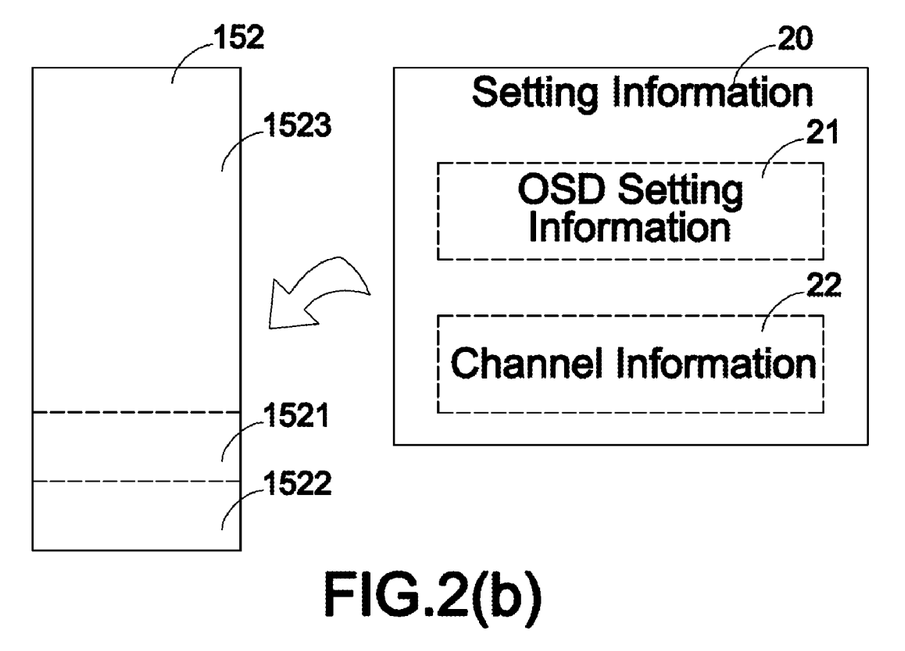
FIG. 2(b) is schematic diagram of setting information 20 and a flash memory 152.

FIG. 2(b) is a schematic diagram of a set of setting information 20 to be stored and a flash memory 152 according to the method of the present invention. As mentioned in the above, the EEPROM is not used in the present invention. Therefore, one principle of the method according to the present invention is that the flash memory 152 is used for storing digital television setting information required by a user. With reference to FIG. 2(b), as discussed in the prior art, the setting information 20 includes on-screen display (OSD) setting information 21 and channel information 22. Further, the flash memory 152 is internally divided into three sections. A first section 1521, and a second section 1522 are primary storage locations; and a remaining third section 1523 is a storage location for operation program codes or firmware described in the prior art. Implementations of the first section 1521 and the second section 1522 shall be described hereinafter.

Similarly, the digital television used in the present invention also comprises the user control interface 140. The digital television unit receives a setting information change signal from the television signal source 101 or the user control interface 140. For example, a setting information change signal is channel information change from the television signal source 101, or a channel search signal or property setting change from the user control interface 140.

As described in the prior art, the OSD setting information 21 in the present invention is entered by a user via the user control interface 140, and includes setting properties of the digital television such as display image contrast, brightness, chromaticity, or volume adjustment, display language, special channel lock, information display, menu language, sleep timer, no-signal mute and full blue screen. The channel information 22 covers the number of channels, channel frequencies, channel identification codes, an electronic programming guide (EPG), channel program titles, channel program ratings and channel sequence, interactive information, etc, of television signals delivered.

Figure 3:
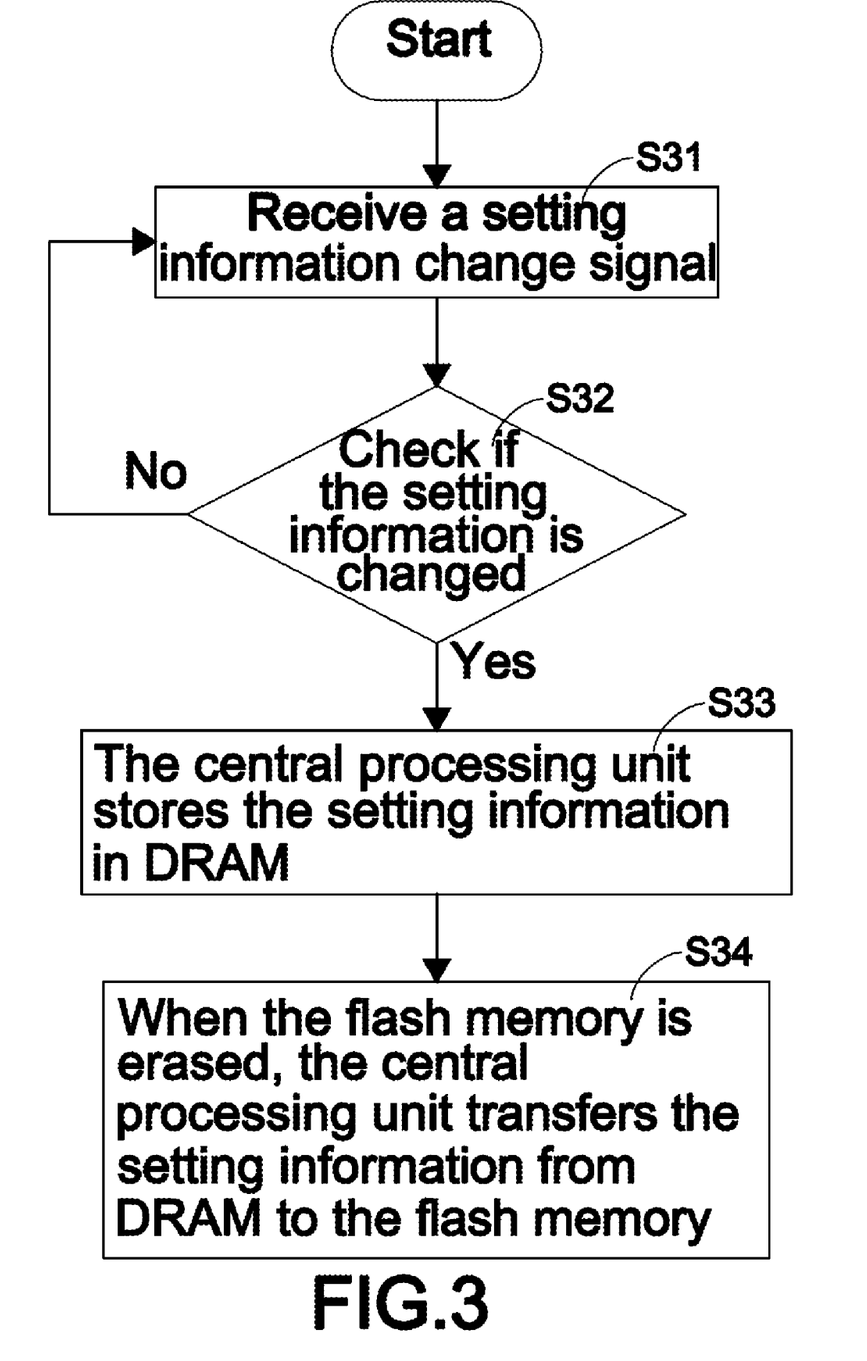
FIG. 3 is a flow chart according to first embodiment of the present invention.

FIG. 3 is a flow chart according to a first embodiment the present invention. As shown in the diagram, the method starts with Step S31 by receiving a setting information change signal from the television signal source 101 or the user control interface 140. In Step S32, the central processing unit 122 checks if the setting information change signal contains changes associated with setting information. For example, the OSD setting information 21 is checked to determine whether being different from previous settings, or whether the channel information 22 sent is updated compared to previous records. Accordingly, in the event of a change, new setting information is generated, e.g., the setting information 20 in FIG. 2(b), with the change being recorded. In Step S33, under control of the central processing unit 122, the setting information is temporarily stored into the DRAM 151, followed by clearing the flash memory 152. In Step S34, when the flash memory 152 is erased, under control of the central processing unit 122, the setting information 20 is transferred from the DRAM 151 to the flash memory 152 for storage.

Therefore, the flash memory replaces the role of the conventional EEPROM as shown with the steps in the FIG. 3, so as to record and update setting information changes using an alternative unit. Thus, without implementing an EEPROM, a digital television design is allowed with a lower product cost and reduced circuit complexity.

However, speed of data storage on a flash memory is slower than that on an EEPROM. Different from an EEPROM that may be directly written into, a flash memory requires an extra step of clearing existing data before writing in new data, thus increasing execution response time. For example, when a user changes audio settings, the user has to wait for a period of time before moving on to other setting changes such as display image or channel selection settings, etc. In order to avoid the challenge above in actual practice, a method based on the concept of the first preferred embodiment according to the present invention shall be illustrated below.

Figure 4:
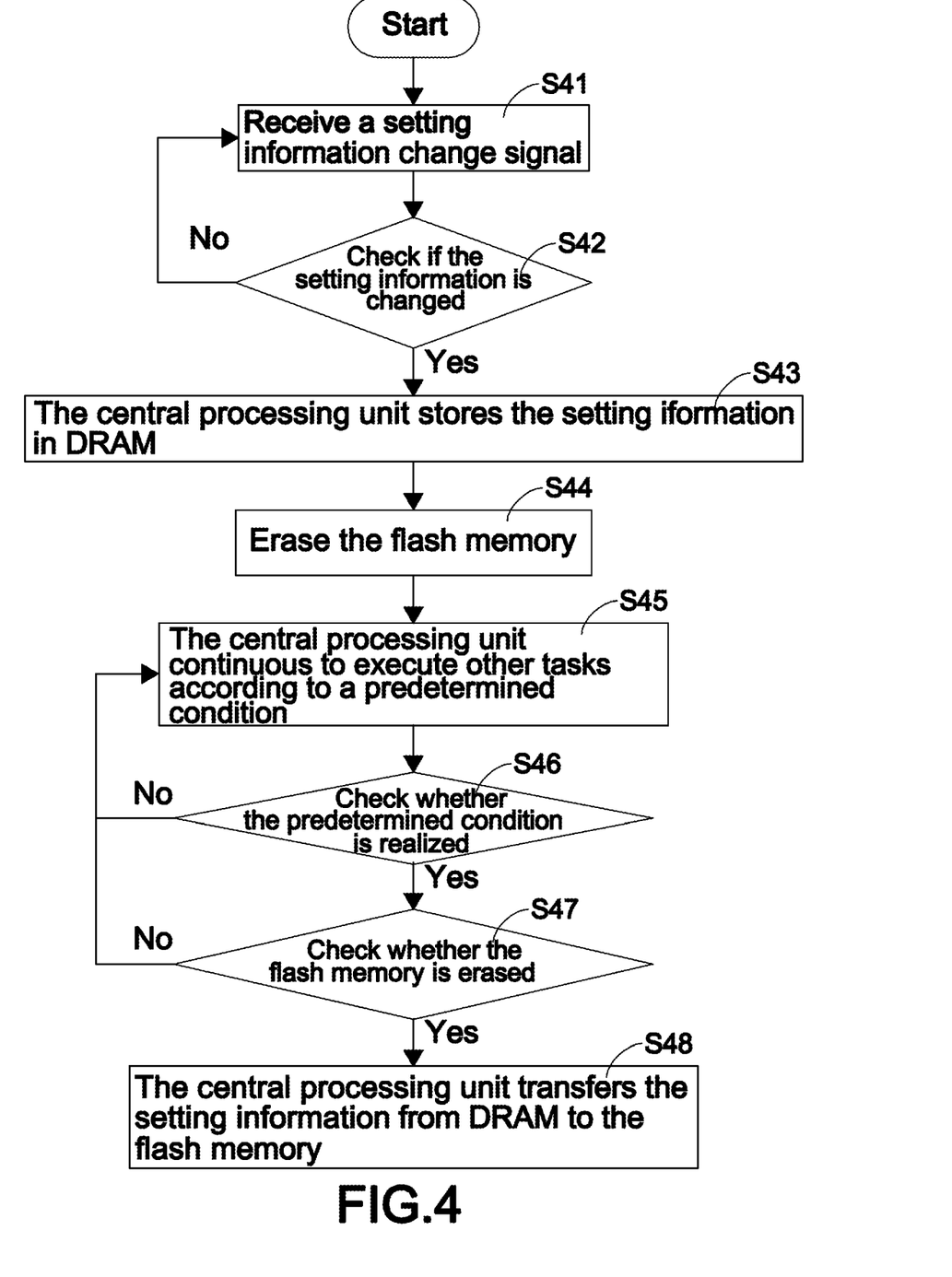
FIG. 4 is a flow chart according to a second embodiment of the present invention.

FIG. 4 is a flow chart of a method according to a second preferred embodiment of the present invention. As shown in the diagram, Step S41 to Step S43 are the same as Step S31 to Step S33 of the first preferred embodiment. In Step S44, the portion of the flash memory 152 used for storing the setting information is erased in a similar manner. However, in Step S45, after sending a clear request to the flash memory 152, the central processing unit 122 continues to execute or complete other tasks according to a predetermined condition, such as a predetermined period of time or completion of the predetermined task. In Step S46, when the predetermined condition is fulfilled, the central processing unit 122 checks again whether the flash memory 152 is erased in Step S47. In Step 48, when the flash memory 152 is erased, under control of the central processing unit 122, the setting information 20 is transferred from the DRAM 151 to the flash memory 152 for storage.

In the second preferred embodiment, the predetermined condition may be reaching a predetermined time period or completing a predetermined task. More specifically, a predetermined time period is set, such that the central processing unit 122 is allowed to execute other tasks during the predetermined time period while clearing after sending out the clear request. Or, one or more predetermined tasks are assigned, such that the central processing unit 122 executes the assigned tasks and then checks whether clearing of the memory is completed. Duration of the predetermined time period and the time required for completing the predetermined tasks are determined by time required for fulfilling the clear request of the memory according to the memory's performance specification. Thus, the central processing unit 122 is allowed to execute other tasks, namely, changing the audio and video settings and channel selection, or other conventional setting operations, thereby optimizing performance of the central processing unit 122 during system operations.

Further, characteristics of the OSD setting information 21 and the channel information 22 are different. In the perspective of demand for storage space, the channel information 22 needs a much larger storage space than the OSD setting information 21. On the contrary, the channel information 22 associated with channel contents of television signal sources need not be updated as frequently as the OSD setting information 21, of which settings are constantly updated by a user. Therefore, the present invention provides the following method to optimize information access under the above circumstance in actual practice.

Figure 5:
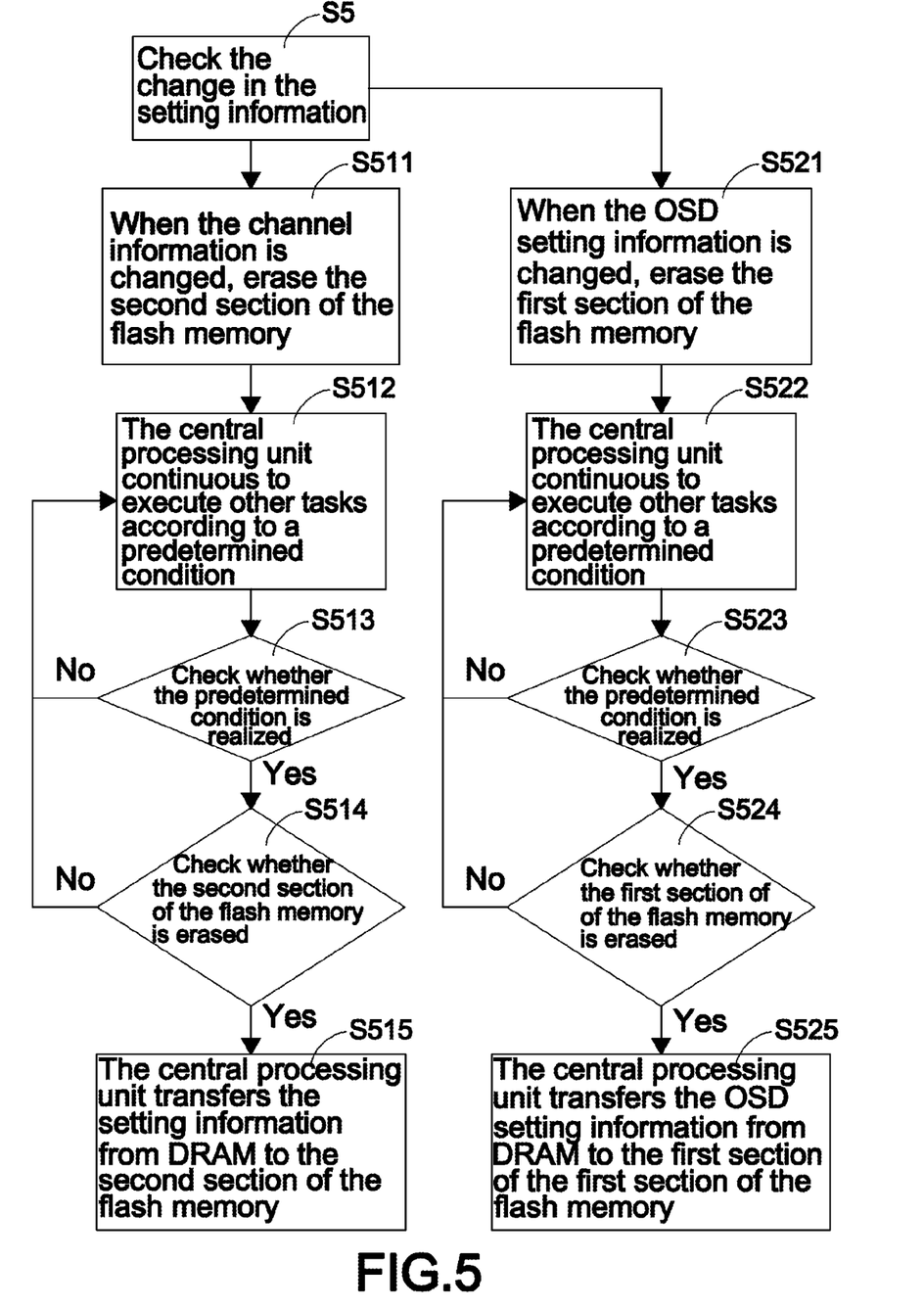
FIG. 5 is a flow chart according to a third embodiment of the present invention.

FIG. 5 is a flow chart according to a third preferred embodiment of the present invention. As shown in the diagram, in Step S5, the central processing unit 122 checks if any changes are made to the setting information 20; that is, the central processing unit 122 checks the status of changes in the OSD setting information 21 and the channel information 22, with information of the changes stored into the DRAM 151. In the third embodiment, the procedure starts with a step that is identical to Step S32 and Step S42 in the first and the second embodiments, respectively. To be exact, the procedure in this embodiment starts when changes occur in the setting information. Also referring to FIG. 2(b), in Step S511, clear the second section 1522 of the flash memory 152 when there is a change in the channel information 22 of the setting information 20. However, in Step S521, clear the first section 1521 of the flash memory 152 when partial change is made only to the OSD setting information 21 without affecting the channel information 22.

Step S512 and Step S513, and Step S522 and Step S523, are identical to Step S45 and Step S46 of the second preferred embodiment in FIG. 4. The central processing unit 122 continues to execute other tasks while executing the clear request on the memory. Next, when the second section 1522 or the first section 1521 is erased in Step S514 and Step S524, the central processing unit 122 transfers the setting information 20 including the OSD setting information 21 and the channel information 22, and the OSD setting information 21, from the DRAM 151 to the second section 1522 and the first section 1521 as in Step S515 and Step S525, respectively. Accordingly, the OSD setting information 21 is transferred when frequent changes are independently made to quickly complete storage of updated information thereof. Likewise, when changes are made on the channel information 22, the most updated channel information 22 and the OSD setting information 21 temporarily stored in the DRAM 151 are jointly transferred.

In the above embodiments, upon checking for changes with the setting information change signal, new setting information is generated once changes are made on the setting information. More specifically, in actual practice, when a setting information change signal at a new time point is received from the television signal source 101 or the user control interface 140, the previous setting information and the setting information at the new time point are checked correspondingly to see if there are any changes. For example, when a user sends a signal via the remote control 141 upon initiating an associated function menu, the function menu with previous settings is displayed on the display panel 132. Another signal is sent when the user adjusts a certain function on the function menu. Differences between the previous and latest setting information indicate that the setting information has been updated.

In the third preferred embodiment, details of content changes are verified. Step 521 to Step 525 are performed when the content change is associated with OSD setting information; Step S511 to Step S515 are performed when the content change is associated with channel information. In addition, two different sets of setting information received at two time points are first stored in the DRAM 151, thus facilitating the central processing unit 122 to verify contents associated with the changes while the two different sets of setting information are stored in the DRAM. According to the third preferred embodiment, Step S521 to Step S525, and Step S511 and S515 are performed in the event that the changes are associated with both the OSD setting information and the channel information.

With reference to FIG. 2(b), the OSD setting information 21 which is updated frequently is independently stored in the first section 1521. On the other hand, when the setting information 20 as a whole is to be updated and stored, the updated setting information 20 may be stored in the second section 1522. Such timing occurs upon completion of autoscan or channel search, meaning that the overall channel information 22 needs to be updated and stored; or when the entire setting information 20 temporarily stored in the DRAM 151 has to be transferred into the flash memory 152 upon powering off the digital television 100. As a result, the OSD setting information 21 stored in the first section 1521 is the most updated settings. Further, the most updated settings may be designed to overwrite information associated with OSD setting information 21 to the second section 1522 during power off. Thus, when again being powered on, the most updated and complete setting information 20 is readily retrieved from the second section 1522, and has contents of settings exactly the same as before previously powered off.

Based on current technologies, the flash memory 152 can be divided into several sections for storing corresponding information, with each section being mandated to meet a minimum memory capacity, namely, 64 KB. To be more explicit, a minimum memory capacity is used as a minimum unit when clearing the flash memory, such that even if information contained by a bit count smaller than that of the minimum unit of 64 KB is to erased, it is essential to clear an entire corresponding section using the minimum unit. Accordingly, information such as the OSD setting information 21 occupying a small memory capacity of generally about 2 KB inevitably results in memory space wastage as well as increased storage processing time. Therefore, to overcome the challenges above in actual practice, the present invention provides the following method to effectively save storage space.

Figure 6A:
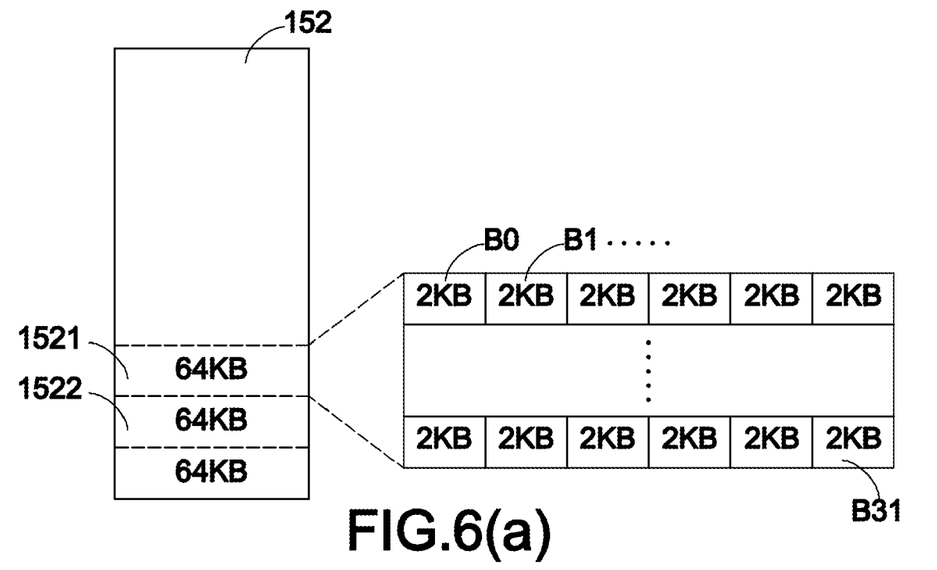
FIG. 6(a) is schematic diagram of a section 1521 of the flash memory 152, divided into a plurality of storage blocks.
Figure 6B:
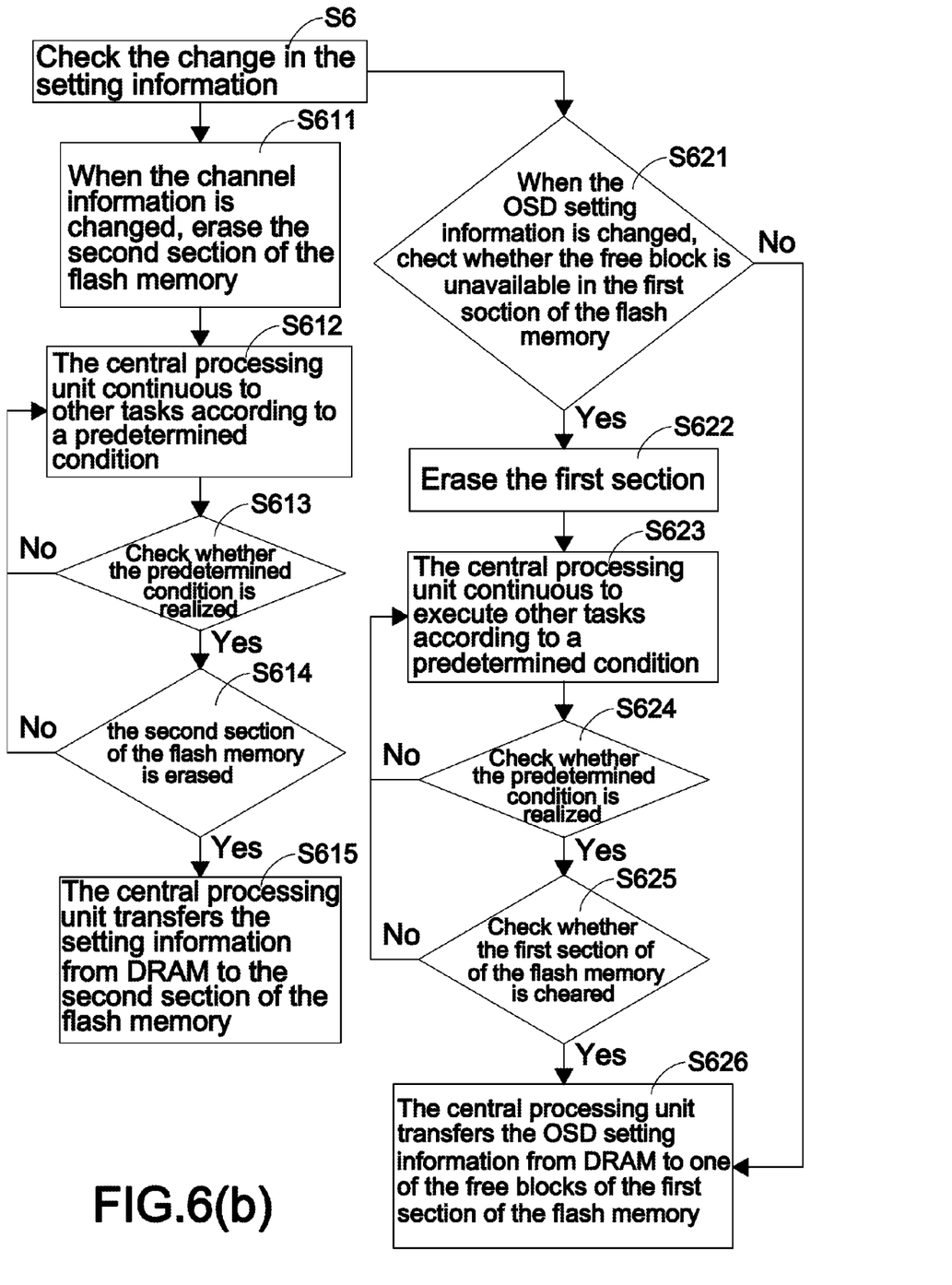
FIG. 6(b) is a flow chart according to a fourth embodiment of the present invention.

FIG. 6(a) is a schematic diagram of the first section 1521 of the flash memory 152, the first section 1521 being divided into a plurality of storage blocks. FIG. 6(b) is a flow chart according to a fourth preferred embodiment of the present invention based on the concept in FIG. 6(a). As shown in FIG. 6(a), the flash memory 152 is divided into various sections including the first section 1521 and the second section 1522, each of which has memory capacity of 64 KB. The first section 1521 is further divided into a plurality of storage blocks B0~B31 each having a memory capacity unit of 2 KB. Therefore, the first section 1521 has 32 storage blocks of 2 KB.

In the flow chart shown in the FIG. 6(b), Step S6, Step S611 to Step S615 are identical to Step S5, Step S511 to Step S515 used in the third preferred embodiment shown in the FIG. 5. When only partial information of the setting information 20 is changed, namely, only the OSD setting information 21 is changed, Step S621 is performed to check if free storage blocks among the plurality of storage blocks B0~B31 of the first section 1521 of the flash memory 1521 are available. If free storage blocks are available, the central processing unit 122 transfers the OSD setting information 21 from the DRAM 151 to a storage block of the first section 1521 as in Step S626. If free storage blocks are unavailable, clear the first section 1521 as in Step S622. Step S623 to Step S624 are identical to Step S45 to Step S46 of the second preferred embodiment shown in the FIG. 4. When the first section 1521 is erased completely as in Step S625, Step S626 follows in which the central processing unit 122 transfers the OSD setting information 21 from the DRAM 151 to one of the plurality of storage blocks B0~B31 of the first section 1521.

In this embodiment, a size of the OSD setting information 21 used is less than 2 KB. Accordingly, the OSD setting information 21 is updated by the unit of a storage block, which is one of the plurality of storage blocks B0~B31 shown in the FIG. 6(a). Further, information is in sequence stored into the plurality of storage blocks B0~B31 of the first section 1521 in order to effectively utilize the memory space. In other words, when free storage block are available in the first section 1521, information is continually written in. When no free storage blocks are available for writing in new information, the entire first section 1521 is first erased followed by writing in. Therefore, not only the memory space utilization is efficient, but also complications of repeated clearing before writing in for each storing and updating is avoided, thereby effectively shortening operation time. In this embodiment, the first section 1521 is only erased when all 32 storage blocks are stored with updates of the OSD setting information 21.

The plurality of storage blocks B0~B31 are used for storing the OSD setting information 21. However, in actual practice, one of the storage blocks, e.g., the storage block B0, may be assigned as a flag block. The OSD setting information 21 is then written in sequence to the plurality of storage blocks from B1, B2, and B3 to B31. The function of the flag block, which is the storage block B0, is to tag which storage block is stored with the most updated OSD setting information 21. Following the tag of the flag block, new information update is written into the storage block located right after the flag block. Similarly, accessing of the information is carried out according to the tag of the flag block.

The second section 1522 may also be further divided into a plurality of storage blocks for storing the setting information 20. When the size of the setting information 20 can fit into the space of the divided storage block of the second section 1522, space of the second section 1522 may then be effectively utilized while optimizing execution time. The associated procedure is the same as the concept in the fourth preferred embodiment of the present invention.

According to embodiments of the invention, the random access memory according to the present invention is a DRAM for temporary information storage. However, according to current technologies, a static random access memory (SRAM) and a cache may also be used in a computer system as well as in the digital television of the present invention. Referring to FIG. 1, a SRAM or a cache (not shown) may be installed inside the central processing unit 122 or coupled to the central processing unit 122. Either of the memory types is capable of performing the same functions as delivered by the DRAM 151, and even with higher access efficiency. Therefore, when the digital television or an associated device is provided with an SRAM or a cache, the concept and the method according to the present invention are also applicable. More specifically, an SRAM or a cache is used to temporarily store information.

In addition, the present invention accomplishes information storage with a flash memory, which is a non-volatile memory. However, according to current designs of the digital television, a micro drive or any other non-volatile storage medium may also be used for information storage. Although being a non-volatile memory, a micro drive does not required an extra step of clearing before writing in but can be directly written in as an EEPROM. To apply the method according to the invention to the digital television provided with a micro drive, memory clearing steps and steps associated with memory clearing are no longer required, while the remaining steps are identical to those in the embodiments above. Therefore, the concept disclosed by the present invention is applicable to different hardware configurations.

To sum up, using the method according to the present invention and a flash memory used in a conventional digital television, storage of associated setting information is completed without an EEPROM, thereby accomplishing the goal of reducing cost. In addition, with respect to the characteristics and disadvantages of a flash memory, the method according to the present invention utilizes the concept of dividing the memory space of a flash memory to effectively reduce execution time and optimize the memory space utilization.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for accessing digital television information in a digital television system, the digital television system comprising a digital television unit, a television signal source, and a user control interface; and the digital television unit comprising a processing unit, a random access memory, and a non-volatile memory, the method comprising:
   receiving a setting information change signal for changing setting information from the television signal source or the user control interface, wherein the setting information comprises a channel information and an on-screen display (OSD) information;
   updating the setting information into the random access memory;
   erasing at least a portion of the non-volatile memory to accommodate the updated setting information;
   transferring the OSD information of the updated setting information from the random access memory to a first section of the non-volatile memory if the updated setting information comprises only OSD information; and
   transferring the updated setting information comprising both the channel information and the OSD information from the random access memory to a second section of the non-volatile memory if the updated setting information comprises channel information or the digital television unit is reset or shutdown.

2. The method for accessing digital television information of claim 1, further comprising:
   executing other tasks by the processing unit after sending a clear request to the non-volatile memory; and
   checking whether clearing of the non-volatile memory is completed upon satisfying a predetermined condition by the processing unit.

3. The method for accessing digital television information of claim 2, wherein the predetermined condition is reaching a predetermined time period or completing a predetermined task.

4. The method for accessing digital television information of claim 1, wherein the setting information change signal is a channel search signal sent by the user control interface.

5. A digital television apparatus comprising a digital television unit, the digital television unit comprising:
a processing unit;
a random access memory, controlled by the processing unit to store a setting information comprising a channel information and an on-screen display (OSD) information therein; and
a non-volatile memory comprising a first section and a second section, controlled by the processing unit to store the OSD information of the setting information transferred from the random access memory to the first section if only the OSD information is updated, and to store the setting information comprising both the channel information and the OSD information transferred from the random access memory to the second section if the channel information is updated or the digital television unit is reset or shutdown.

6. The digital television apparatus of claim 5, wherein the non-volatile memory is a flash memory or a rewritable compact disc.

7. The digital television apparatus of claim 5, wherein the digital television apparatus further comprises a user control interface, and the digital television unit receives a setting information change signal from a television signal source or the user control interface.

8. The digital television apparatus of claim 7, wherein the channel information comprises at least information of channel frequencies, channel identification codes, and channel program titles.

9. The digital television apparatus of claim 7, wherein the OSD information is the first information comprising user-specified digital television unit settings control via the user control interface, the settings including contrast, brightness and chromaticity of image display or volume.

10. A digital television comprising:
a processing unit;
a random access memory, controlled by the processing unit to store a setting information comprising a channel information and an on-screen display (OSD) information therein; and
a non-volatile memory, controlled by the processing unit to store the setting information transferred from the random access memory into the non-volatile memory;
wherein, the processing unit executes other tasks after sending a clear request to the non-volatile memory, and transfers the OSD information of the setting information from the random access memory to a first section of the non-volatile memory if only the OSD information is updated and transfers the setting information comprising both the channel information and the OSD information to a second section of the non-volatile memory if the channel information is updated or the digital television unit is reset or shutdown, when erasing of the non-volatile memory is completed; and the setting information comprises a channel information and an OSD information.

11. A method for accessing digital television information in a digital television system, the digital television system comprising a digital television unit, a television signal source and a user control interface, and the digital television unit comprising a processing unit, a random access memory and a non-volatile memory, the method comprising:
receiving a setting information change signal from the television signal source or the user control interface;
storing a setting information comprising a channel information and an on-screen display (OSD) information into the random access memory by the processing unit; and
erasing the non-volatile memory; and
transferring a first information of the setting information comprising the OSD information from the random access memory to first section of the non-volatile memory if only the OSD information is updated, and the setting information comprising both the channel information and the OSD information from the random access memory to second section of the non-volatile memory if the channel information is updated or the digital television unit is reset or shutdown, by the processing unit.

12. The method for accessing digital television information of claim 11, comprising:
receiving a second setting information change signal sent from the television signal source or the user control interface;
transferring the first information of the setting information from the random access memory to the first section of the non-volatile memory by the processing unit when the second setting information change signal indicates only the first information of the setting information is changed; and
transferring the setting information from the random access memory to the second section of the non-volatile memory by the processing unit when the second setting information change signal indicates changes are made in addition to changes made on the first information of the setting information.

13. A method for accessing a setting information for a digital television, the digital television comprises a random access memory and a non-volatile memory and the setting information comprises a channel information and an on-screen display (OSD) information, the method comprising:
receiving a setting information change signal;
when the setting information change signal indicates only the OSD information is changed,
checking whether free storage blocks among a plurality of storage blocks of a first section of the non-volatile memory are available; and
storing the OSD information in a free storage block if free storage blocks are available, or clearing the first section of the non-volatile memory if free storage blocks are unavailable, and then storing the OSD information in one erased block of the plurality of storage blocks; and
when the setting information change signal indicates if the channel information is updated or the digital television unit is reset or shutdown, clearing a second section of the non-volatile memory and storing the OSD information in the second section;
wherein the plurality of storage blocks of the first section of the non-volatile memory are used for storing the OSD information;
wherein, the second section of the non-volatile memory comprises at least one storage block for storing the setting information comprising both the channel information and the OSD information.

14. The method for accessing digital television information of claim 13, wherein the plurality of storage blocks of the first section further comprises a flag block for identifying location of a storage block of the OSD information.

* * * * *